United States Patent
Strongin et al.

(10) Patent No.: US 10,520,101 B2
(45) Date of Patent: Dec. 31, 2019

(54) CONTOURED CHECK VALVE DISC FOR LOW CRACKING PRESSURE

(71) Applicant: FLUID HANDLING LLC., Morton Grove, IL (US)

(72) Inventors: Mikhail Strongin, Northbrook, IL (US); Mrinalini Litoriya, Evanston, IL (US); Mahesh Nair, Evanston, IL (US); Stanley Paul Evans, Morton Grove, IL (US); Florin Rosca, Niles, IL (US)

(73) Assignee: Fluid Handling LLC, Morton Grove, IL (US)

( * ) Notice: Subject to any disclaimer, the term of this patent is extended or adjusted under 35 U.S.C. 154(b) by 26 days.

(21) Appl. No.: 15/715,779

(22) Filed: Sep. 26, 2017

(65) Prior Publication Data

US 2018/0128387 A1    May 10, 2018

Related U.S. Application Data

(60) Provisional application No. 62/399,614, filed on Sep. 26, 2016.

(51) Int. Cl.
    *F16K 15/03*    (2006.01)
    *F16K 31/12*    (2006.01)
(52) U.S. Cl.
    CPC ............. *F16K 15/03* (2013.01); *F16K 31/12* (2013.01); *Y10T 137/7903* (2015.04)
(58) Field of Classification Search
    CPC .. F16K 15/03; F16K 31/12; Y10T 1377/7898; Y10T 1377/7908; Y10T 1377/7903
    See application file for complete search history.

(56) References Cited

U.S. PATENT DOCUMENTS

| | | | |
|---|---|---|---|
| 505,792 A | * | 9/1893 | Henn ...................... F16K 15/03 |
| | | | 137/527.2 |
| 516,407 A | | 3/1894 | Schutte |

(Continued)

FOREIGN PATENT DOCUMENTS

| | | |
|---|---|---|
| CN | 2867009 Y | 2/2007 |
| CN | 202048245 U | 11/2011 |

(Continued)

OTHER PUBLICATIONS

"How does it work: Check Valves," Cameron, cameron.slb.com, printed Oct. 2016. https://cameron.slb.com/products-and-services/valves-index/valve-academy/how-does-it-work-check-valves.

(Continued)

*Primary Examiner* — Marina A Tietjen
*Assistant Examiner* — Frederick D Soski
(74) *Attorney, Agent, or Firm* — Ware, Fressola, Maguire & Barber LLP

(57) ABSTRACT

A contoured check valve disc features a pivot portion and a check valve portion. The check valve portion is attached to the pivot portion, and has two sides, a first side to respond to the fluid flow in a first direction and move the check valve portion away from a fluid opening to the one or more open positions depending on the fluid flow to allow the fluid to flow through the fluid opening, and a second and opposing side to respond to fluid flow in an opposite direction through the fluid opening and move the check valve portion towards the fluid opening to the closed position to seal the fluid opening and stop fluid flow. The check valve portion a near-sloped portion formed nearest to the pivot portion, having a near-sloped contoured surface curving away from the pivot point to a first point of inflection with a first curvature, and a far-sloped portion formed farthest from the pivot portion, having a far-sloped contoured surface curving (Continued)

away from the point of inflection towards a farthest point away from the pivot portion with a second curvature that is less curved or bent than the first curvature, the near-sloped portion and the far-sloped portion combining to form a combined surface having a contoured pressure/force distribution on the first side to respond to the fluid flow and move the check valve portion away from the fluid opening.

6 Claims, 8 Drawing Sheets

(56) References Cited

U.S. PATENT DOCUMENTS

| | | | |
|---|---|---|---|
| 2,262,726 A | | 11/1941 | Nickerson |
| 2,711,188 A | | 6/1955 | Nickerson |
| 2,930,400 A | * | 3/1960 | Wheatley ................ F16K 15/03 137/515.7 |
| 3,290,001 A | | 12/1966 | Taylor |
| 3,327,732 A | | 6/1967 | Deve |
| 3,394,731 A | * | 7/1968 | Elliott .................... F16K 15/03 137/527.8 |
| 3,452,778 A | * | 7/1969 | Willis ................... F16K 15/038 137/512.1 |
| 3,640,306 A | * | 2/1972 | Vogt ..................... F16K 15/035 137/512.1 |
| 3,665,950 A | | 5/1972 | Nelson |
| 3,875,963 A | | 4/1975 | Buck et al. |
| 3,883,111 A | | 5/1975 | Jourdan |
| 3,926,215 A | | 12/1975 | MacLeod |
| 3,926,216 A | | 12/1975 | Rulcker |
| 3,934,608 A | * | 1/1976 | Guyton ................. F16K 15/03 137/527.8 |
| 3,937,240 A | | 2/1976 | Nanny |
| 4,005,732 A | * | 2/1977 | Buckner ............... F16K 15/038 137/512.1 |
| 4,067,356 A | | 1/1978 | Kreuz |
| 4,079,751 A | | 3/1978 | Partridge et al. |
| 4,230,150 A | * | 10/1980 | Scaramucci ............ F16K 15/03 137/527 |
| 4,249,567 A | * | 2/1981 | Weiss .................... F16K 15/038 137/512 |
| RE30,532 E | * | 3/1981 | Buckner ............... F16K 15/038 137/512.1 |
| 4,550,749 A | | 11/1985 | Krikorian |
| 4,977,926 A | * | 12/1990 | Hocking .............. A47B 96/068 137/512.1 |
| D319,683 S | * | 9/1991 | Scaramucci ................ D23/237 |
| D319,684 S | * | 9/1991 | Scaramucci ................ D23/237 |
| D320,644 S | * | 10/1991 | Scaramucci ................ D23/237 |
| 5,161,570 A | * | 11/1992 | Scaramucci ............ F16K 15/03 137/454.5 |
| 5,341,840 A | * | 8/1994 | Manson ................. F16K 15/03 137/527.8 |
| 5,392,810 A | * | 2/1995 | Cooper ................ F16K 15/038 137/512.1 |
| 5,507,318 A | | 4/1996 | Israelson |
| 5,819,794 A | | 10/1998 | Anderson |
| 6,537,043 B1 | | 3/2003 | Chen |
| 8,328,543 B2 | | 12/2012 | Wilson |
| 2016/0032920 A1 | | 2/2016 | Hatami Aghdam |

FOREIGN PATENT DOCUMENTS

| | | |
|---|---|---|
| CN | 204592437 U | 8/2015 |
| KR | 101753664 B1 | 6/2016 |

OTHER PUBLICATIONS

"Chexter check valve," Mueller Steam Specialty™, muellersteam. com, printed Oct. 2016. http://www.muellersteam.com/inDepth/CHEXTER.asp.
"Titled® disc check valve," Val-Matic®, valmatic.com, printed Oct. 2016. http://www.valmatic.com/brochures/TiltedDisc_9000.pdf.
English language Abstract of KR101753664 unavailable.
English language Abstract of CN202048245U.
English language Abstract of CN2867009Y.
English language Abstract of CN204592437U.

* cited by examiner

Figure 2: Contoured check valve disc

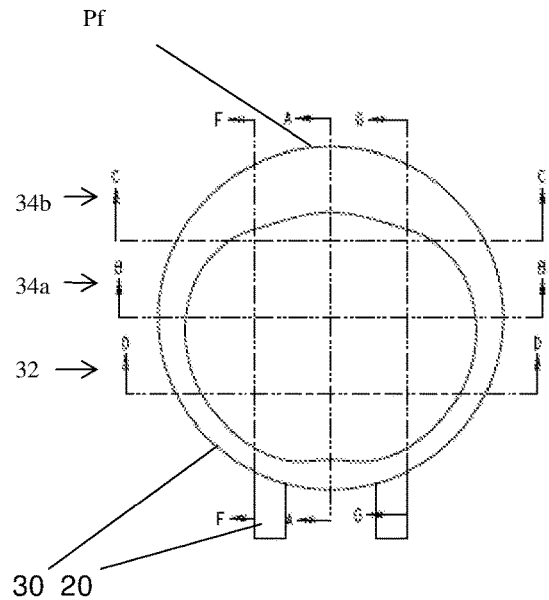
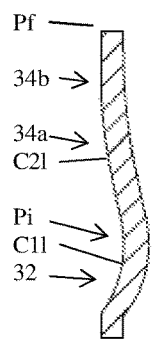
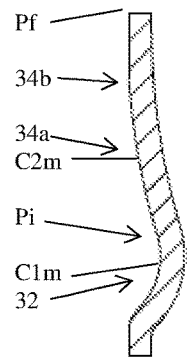
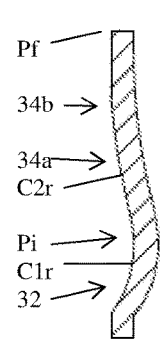
Fig. 4A     Fig. 4F     Fig. 4E     Fig. 4G
Fig. 4D
Fig. 4B
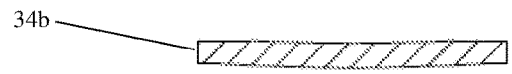
Fig. 4C
Figure 4

Fig. 5: Fluid Flow Simulation with Simulation Fluid Flow Arrows

CONTOURED CHECK VALVE DISC FOR LOW CRACKING PRESSURE

CROSS-REFERENCE TO RELATED APPLICATION

This application claims benefit to provisional patent application Ser. No. 62/399,614, filed 26 Sep. 2016, which is hereby incorporated by reference in its entirety.

BACKGROUND OF THE INVENTION

1. Field of the Invention

The present invention relates to a check valve.

2. Brief Description of Related Art

A check valve is a uni-directional flow control device that allows a fluid under pressure to flow through it in only one direction while mechanically preventing the same fluid from flowing back through in the opposite direction. The cracking pressure of a check valve is the minimum inlet, or upstream, pressure that will open the valve and allow it to operate. One common style of check valve is a swing check, or tilting disc check valve, where a disc or plate is used to prevent fluid from flowing in the wrong direction. Typical check valves of this nature feature a flat disc or plate (see FIG. 7A), against which the fluid pressure acts to generate sufficient force to push the disc and open the valve.

There is a need in the industry for a better way to design a check valve.

SUMMARY OF THE INVENTION

In summary, the present invention provides a contoured check valve disc for swing or tilted disc type check valves.

The contoured check valve disc is shaped such that in a closed position a contour provides a targeted surface area for an upstream fluid pressure to act upon. The shape of the check valve disc results in the fluid forces on the upstream side of the contoured check valve disc to act on the contoured surface in multiple directions providing a greater distribution of the acting forces. The resultant forces on the contoured check valve disc act in a manner that provides both a lateral push and a vertical lift to move the check valve disc out of the way of the fluid path. In addition, the contour enables an increased vertical lift component of the forces as compared to a known flat faced disc thus reducing the pressure required to open the check valve disc. The location of the contour along the length of the contoured check valve disc is derived by fluid flow simulations to optimize the center of gravity (CoG) of the check valve disc to reduce the torque at the pivot and allow the pressure on the check valve disc to act effectively in fully open condition while providing streamlined flow along the surface of the contoured check valve disc.

The contour allows for the fluid force to continuously act on the contoured check valve disc in a manner so as to provide a steady lift action as the fluid flows through the check valve. This dynamic component helps fully open the valve quicker upon cracking, and to remain open at lower fluid velocities.

One advantage of the present invention is that a disc with the contoured shape featured in the present invention will allow the contoured check valve to open at a significantly lower cracking pressure than found with a flat plate disc design and remain open at lower fluid velocities.

SPECIFIC EMBODIMENTS

According to some embodiments, and by way of example, the present invention may include, or take the form of, a contoured check valve disc, featuring a new and unique combination of a pivot portion and a check valve portion.

The pivot portion may include an aperture configured to receive a pivot rod to allow the contoured check valve disc to pivot between a closed position and one or more open positions.

The check valve portion is attached to the pivot portion and has two opposing sides. A first side may be configured to respond to fluid flow in a first direction and move the check valve portion away from the fluid opening to the one or more open positions depending on the fluid flow to allow the fluid to flow through a fluid opening. A second and opposing side may be configured to respond to fluid flow in an opposite direction through the fluid opening and move the check valve portion towards the fluid opening to the closed position to seal the fluid opening and stop fluid flow.

The first side of the check valve portion may include at least two contoured portions with different disc contours defined with respect to the pivot point, a plane defining the check valve portion, and a farthest point away from the pivot portion.

The at least two contoured portions may include:
a near-sloped portion formed nearest to the pivot portion, having a near-sloped contoured surface curving away from the pivot point to a first point of inflection, and having a first curvature, and
a far-sloped portion formed farthest from the pivot portion, having a far-sloped contoured surface curving away from the point of inflection towards a farthest point away from the pivot portion, and having a second curvature that is less curved or bent than the first curvature, the near-sloped portion and the far-sloped portion combining to form a combined surface having a contoured pressure/force distribution on the first side to respond to the fluid flow and move the check valve portion away from the fluid opening.

According to some embodiments, the present invention may also include one or more of the following features:

The check valve portion may include an area having a contoured profile formed at about the inflection point, e.g. where the fluid force acting on the one side provides a steady lift and lateral push action.

The contoured check valve disc may have a center of gravity (CoG) defined in the far-sloped portion that is between the inflection point and a middle point to reduce torque at the pivot point, e.g., including where the CoG is derived from a flow simulation.

The two opposing sides may be configured with substantially the same contour.

The contoured check valve disc may be a swing or tilt disc type check valve.

The far-sloped portion may include, or be formed as, two sub-portions, a first sub-portion being substantially flat and formed closest to a farthest point from the pivot portion, and a second sub-portion being formed between the near-sloped portion and the first sub-portion, having less curvature than the first curvature of the near-sloped portion, and having more curvature than the first sub-portion.

BRIEF DESCRIPTION OF THE DRAWING

The drawing, which is not necessarily drawn to scale, includes the following Figures:

FIG. 4 includes FIGS. 4A thru 4G, where FIG. 4A is a diagram of a contoured check valve disc; FIG. 4B is a section view of the contoured check valve disc in FIG. 4A along section lines B-B; FIG. 4C is a section view of the contoured check valve disc in FIG. 4A along section lines C-C; FIG. 4D is a section view of the contoured check valve disc in FIG. 4A along section lines D-D; FIG. 4E is a section view of the contoured check valve disc in FIG. 4A along section lines A-A; FIG. 4F is a section view of the contoured check valve disc in FIG. 4A along section lines F-F; and FIG. 4G is a section view of the contoured check valve disc in FIG. 4A along section lines G-G; all according to some embodiments of the present invention.

Similar parts in Figures are labeled with similar reference numerals and labels for consistency.

Figure 1:
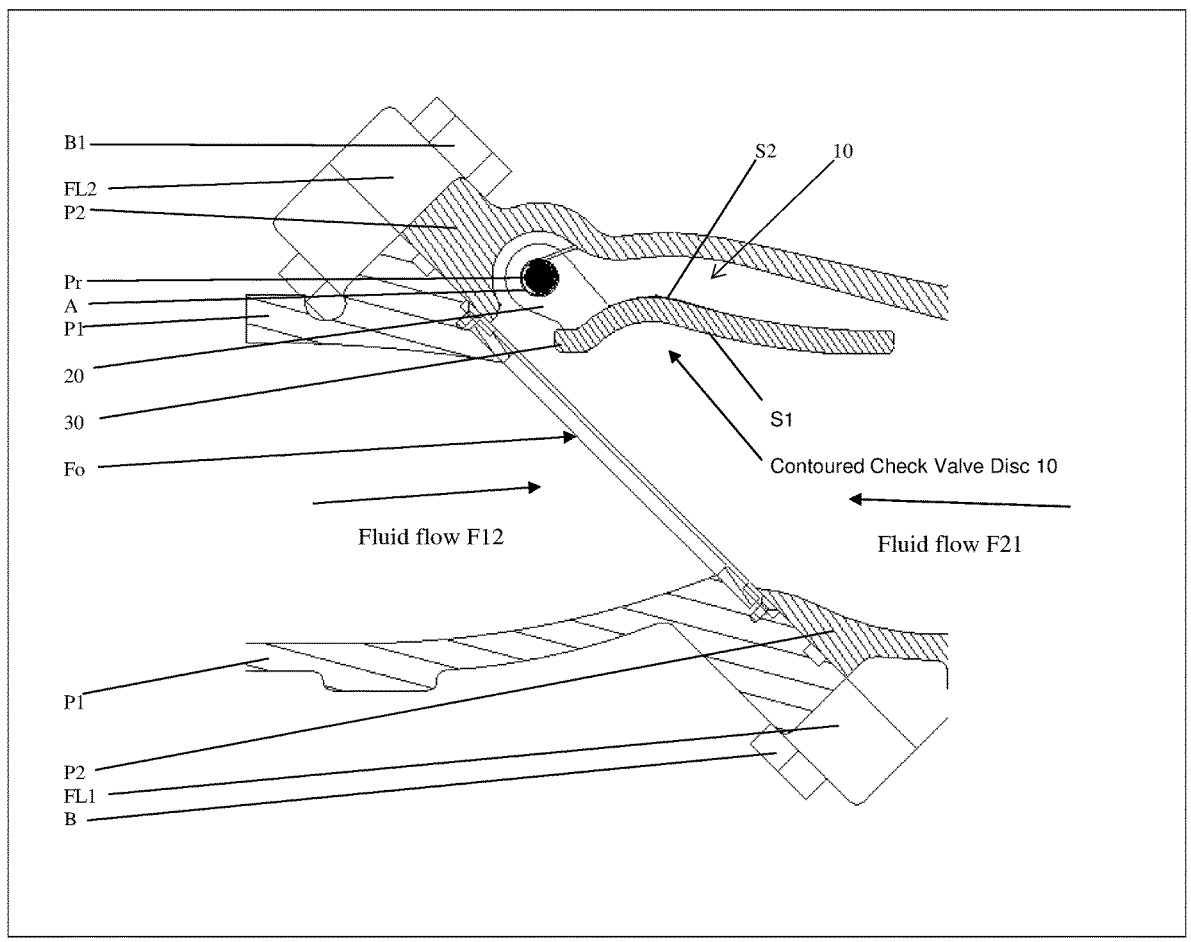
FIG. 1 shows a diagram in cross-section of an arrangement having a contoured check valve disc, according to some embodiments of the present invention.

Every lead line and associated reference label for every element is not included in every Figure of the drawing to reduce clutter in the drawing as a whole.

DETAILED DESCRIPTION OF THE INVENTION

FIG. 1 shows a piping arrangement P that includes first piping P1 coupled to second piping P2 by bolts B passing thru piping flanges FL1, FL2, and having a fluid opening Fo with a contoured check valve disc generally indicated as 10 coupled inbetween and thereto for allowing a fluid flow F12 in one direction or stopping a fluid flow F21 in the opposite direction. In FIG. 1, the fluid flow F12 will flow in the one direction indicated by an arrow from piping P1 to P2 when the contoured check valve disc 10 is forced open, e.g., by the fluid flow F12. In contrast, the fluid flow F21 will not flow in the opposite direction indicated by a corresponding arrow from piping P2 to P1 when the contoured check valve disc 10 is forced closed, e.g., by the fluid flow F21.

Figure 2:
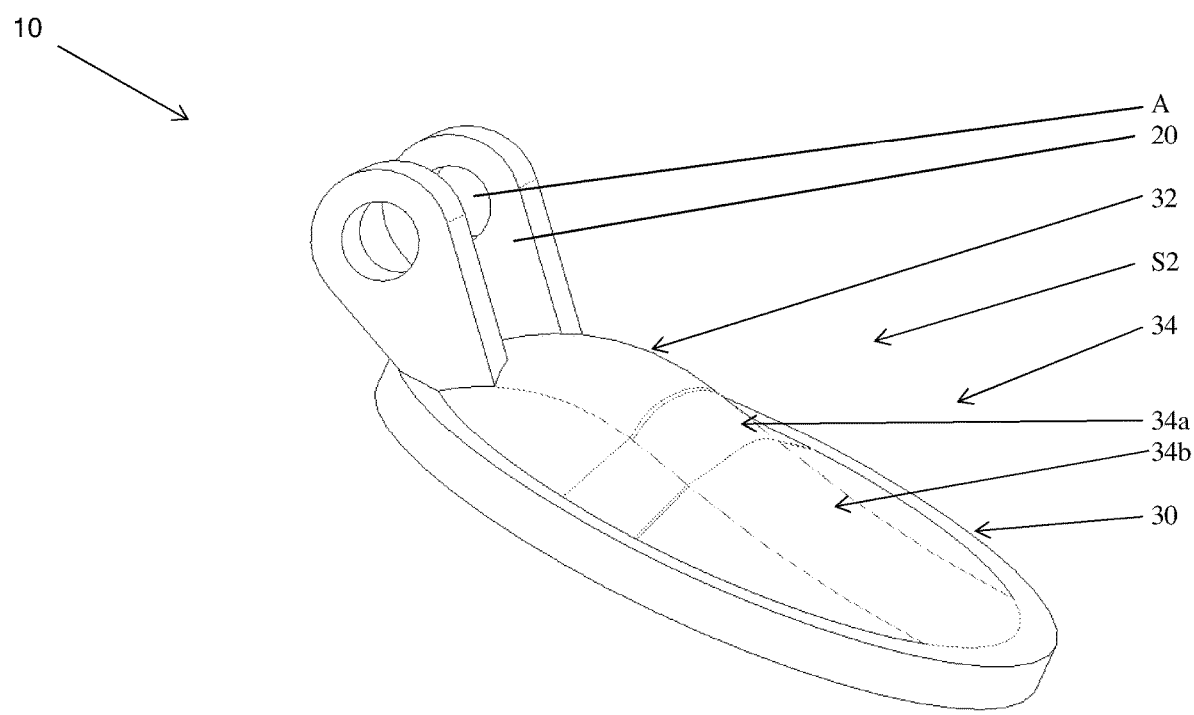
FIG. 2 shows a side perspective view of a top side of a contoured check valve disc, according to some embodiments of the present invention.
Figure 3:
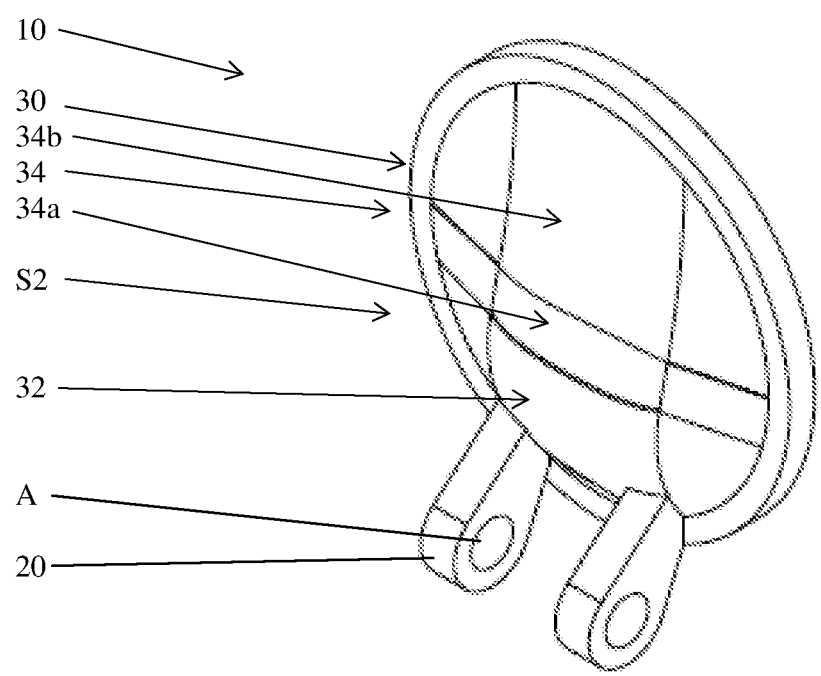
FIG. 3 shows a top perspective view of a top side of a contoured check valve disc, according to some embodiments of the present invention.

According to some embodiments, and by way of example, the present invention may include, or take the form of, the contoured check valve disc 10, featuring a new and unique combination of a pivot portion 20 and a check valve portion 30. FIGS. 2 and 3 show examples of the contoured check valve disc 10.

The pivot portion 20 may include an aperture A configured to receive a pivot rod Pr to allow the contoured check valve disc 10 to pivot between a closed position and one or more open positions.

The check valve portion 30 is attached to the pivot portion Pr and has two opposing sides, S1, S2. The two opposing sides S1, S2 may be configured with substantially the same contour, e.g., consistent with that shown in FIGS. 4 and 5. A first side S1 is configured to respond to the fluid flow F12 in the one direction and move the check valve portion 30 away from the fluid opening Fo to the one or more open positions depending on the fluid flow F12 to allow the fluid to flow through the fluid opening Fo. A second and opposing side S2 is configured to respond to fluid flow F21 in the opposite direction through the fluid opening Fo and move the check valve portion 30 towards the fluid opening Fo to the closed position to seal the fluid opening Fo and stop fluid flow F21.

The first side S1 of the check valve portion 30 may include at least two contoured portions 32, 34 with different disc contours, e.g., defined with respect to the pivot point PP and a farthest point P3 away from the pivot portion PP.

Figure 6:
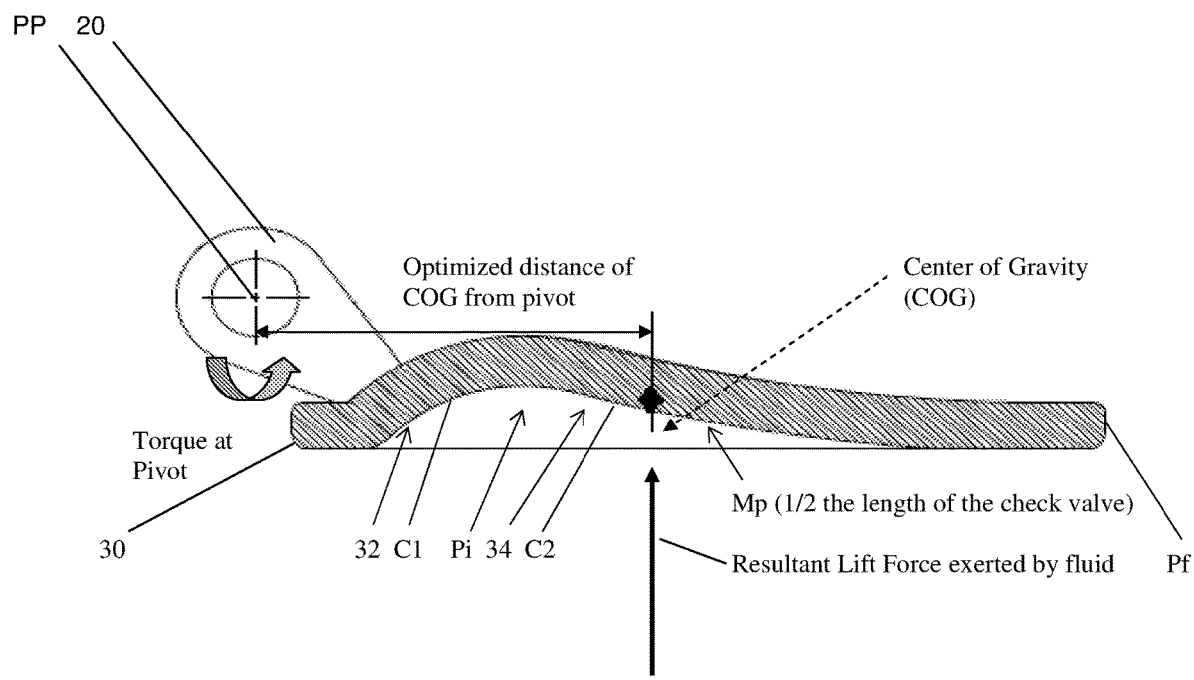
FIG. 6 is a diagram of the contoured check valve disc showing a resultant lift force exerted by fluid, a Center of Gravity (COG), and an optimized distance of COG from the pivot point, according to some embodiments of the present invention.

The at least two contoured portions 32, 34 may include, or take the form of:
- a near-sloped portion 32 formed nearest to the pivot portion 20, having a near-sloped contoured surface Sn curving away from the pivot point PP to a first point of inflection Pi, and having a first curvature C1 (FIG. 6), and
- a far-sloped portion 34 formed farthest from the pivot portion 20, having a far-sloped contoured surface Sf curving away from the point of inflection Pi towards a farthest point Pf away from the pivot portion 20, and having a second curvature C2 (FIG. 6) that is curved less than the first curvature C1 (i.e., less curvature), the near-sloped portion 32 and the far-sloped portion 34 combining to form a combined surface Sn, Sf having a contoured pressure/force distribution on the first side S1 configured to respond to the fluid flow F12 and move the check valve portion 30 away from the fluid opening Fo, according to some embodiments of the present invention.

Figure 5:
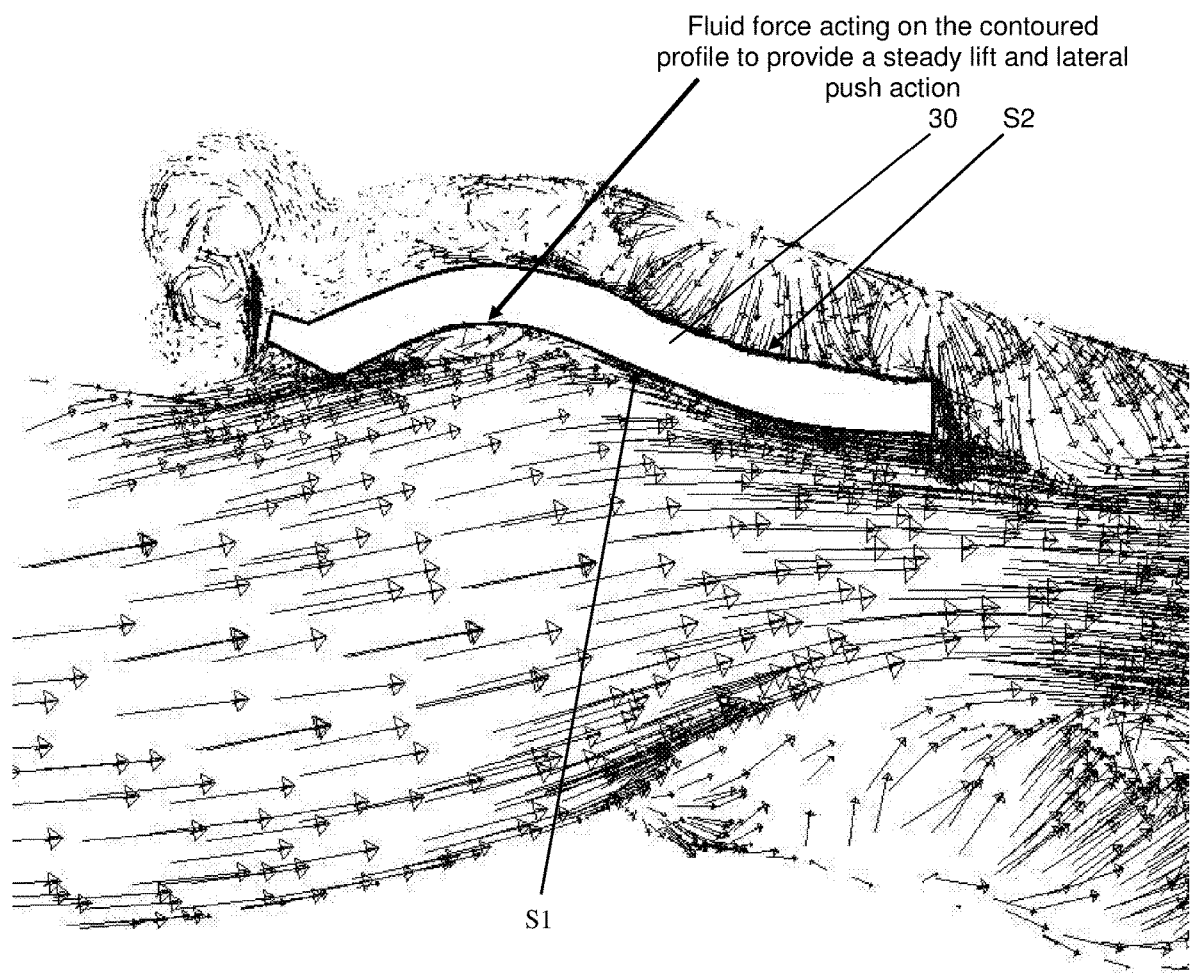
FIG. 5 is a diagram of a flow simulation for a contoured check valve disc showing fluid forces acting on the contoured profile to provide a steady lift and lateral push action, according to some embodiments of the present invention.
Figure 7A:
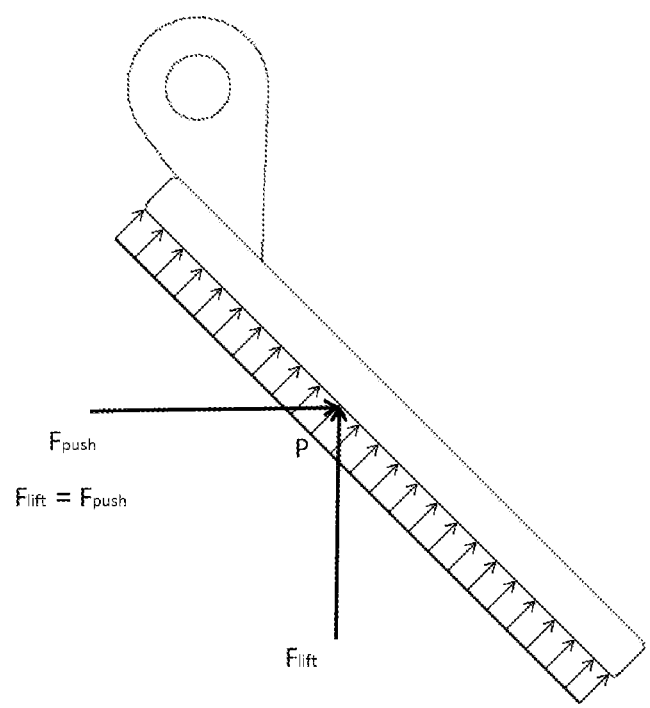
FIG. 7A shows a pressure/force distribution of a check valve disc that is known in the art.
Figure 7B:
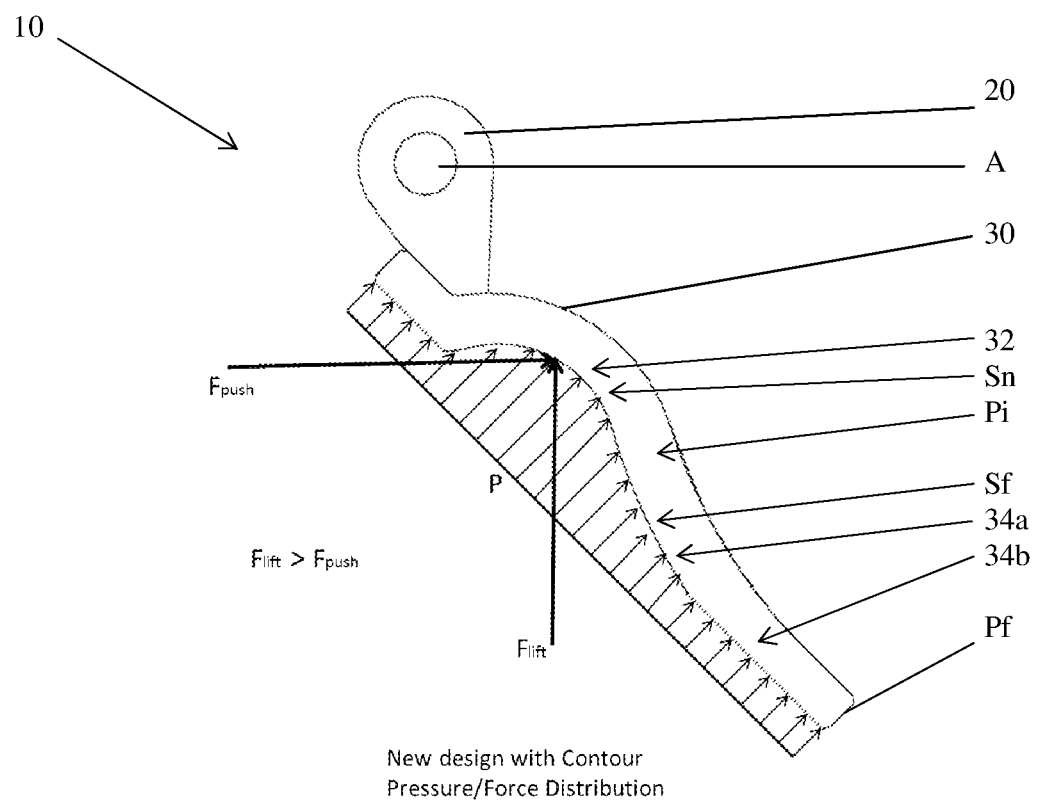
FIG. 7B shows a corresponding pressure/force distribution of a contoured check valve disc, according to some embodiments of the present invention.

By way of example, see the contoured pressure/force distribution for the contoured check valve disc 10 shown in FIGS. 5 and 7B. Moreover, compare the contoured pressure/force distribution for the contoured check valve disc 10 shown in FIGS. 5 and 7B to the prior art check valve disc shown in FIG. 7A, which has a flat surface having a flat pressure/force distribution with the same pressure pushing or lifting the prior art check valve disk from front-to-back, as well as laterally, as shown. In FIG. 5, the fluid force acting of the contoured surface of the first side S1 provides a steady lift and lateral pushing action, e.g., consistent with that which the multiplicity of flow arrows indicate.

FIG. 4 shows various cross-sections of the contoured check valve disc 10, e.g., from left-to-right in FIG. 4A as shown, as well as from the pivot portion 20 to the farther point Pf at the end of the contoured check valve disc 10.

For example, FIGS. 4B, 4C and 4D show the left-to-right contour profiles of the contoured check valve disc 10, corresponding to the near-sloped portion 32 and the far-sloped portion 34, which includes sub-portions 34a, 34b, as shown. In FIGS. 4B, 4C and 4D, the left-to-right contour profiles of the near-sloped portion 32 and the sub-portions 34a, 34b are substantially symmetrical. Moreover, the left-to-right curvature of the near-sloped portion 32 is greater than the left-to-right curvature of the sub-portions 34a, 34b of the far-sloped portion 34. In other words, the left-to-right curvature of the contoured check valve disc 10 is greater nearer to the pivot portion 20 and flatter nearer to the farthest point Pf.

For example, FIGS. 4E, 4F and 4G show the front-to-back contour profiles of the contoured check valve disc 10 from the pivot portion 20 to the farthest point Pf, e.g., corresponding to the near-sloped portion 32 and the far-sloped sub-portions 34a, 34b, as shown. In FIGS. 4E, 4F and 4G, the front-to-back curvature C1l, C1m, C1r of near-sloped portion 32 is more curved (i.e., greater) than the corresponding front-to-back curvature C2l, C2m, C2r of the far-sloped portion 34 and sub-portions 34a, 34b, as shown. The corresponding front-to-back curvature of the far-sloped sub-portions 34b is substantially flat (i.e., no meaningful curvature), as shown. FIG. 7B shows in further detail the front-to-back contour profiles of the contoured check valve disc 10 from the pivot portion 20 to the farthest point Pf, which forms at least part of the surface or side S1 having the contoured pressure/force distribution The contoured check valve disc 10 may be configured and dimensioned to have a center of gravity (CoG) defined in relation to the far-sloped portion 34 that is between the point of inflection Pi and a middle point Pm (FIG. 6) to reduce torque at the pivot point PP, e.g., including where the CoG is derived from a flow simulation.

Point of Inflection

As one skilled in the art would appreciate, a point of inflection like point Pi is understood to be a point at which a change in the direction of curvature occurs, e.g., including a point at which the curve changes from being concave to convex, or vice versa.

Curvature

As one skilled in the art would appreciate, curvature is the amount by which a geometric object such as a surface deviates from being a flat plane, or a curve from being straight as in the case of a line. In other words, the term "curvature" is understood to mean "the amount of bend" in the surface. For example, if a first curvature is less than a second curvature, then the first curvature has more bend than the second curvature.

Fluid Flow Simulations

Techniques for performing fluid flow simulations are known in the art, and the scope of the invention is not intended to be limited to any particular type or kind thereof either now known or later developed in the future.

The Scope of the Invention

Further still, the embodiments shown and described in detail herein are provided by way of example only; and the scope of the invention is not intended to be limited to the particular configurations, dimensionalities, and/or design details of these parts or elements included herein. In other words, one skilled in the art would appreciate that design changes to these embodiments may be made and such that the resulting embodiments would be different than the embodiments disclosed herein, but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What we claim is:

1. A contoured check valve disc, comprising:
    a pivot portion having an aperture configured to receive a pivot rod to allow the contoured check valve disc to pivot on a pivot point between a closed position and one or more open positions; and
    a check valve portion attached to the pivot portion and having two sides, a first side being configured to respond to the fluid flow in a first direction and move the check valve portion away from a fluid opening to the one or more open positions depending on the fluid flow to allow the fluid to flow through the fluid opening, and a second and opposing side being configured to respond to fluid flow in an opposite direction through the fluid opening and move the check valve portion towards the fluid opening to the closed position to seal the fluid opening and stop fluid flow,
    the check valve portion having at least two contoured portions with different disc contours defined with respect to the pivot point and a farthest point away from the pivot portion, including
        a near-sloped portion formed nearest to the pivot portion, having a near-sloped contoured surface curving away from the pivot point to a point of inflection with a first curvature, and
        a far-sloped portion formed farthest from the pivot portion, having a far-sloped contoured surface curving away from the point of inflection towards a farthest point away from the pivot portion with a second curvature that is less curved or bent than the first curvature, the near-sloped portion and the far-sloped portion combining to form a combined surface having a contoured pressure/force distribution on the first side to respond to the fluid flow and move the check valve portion away from the fluid opening; wherein the contoured check valve disc has a center of gravity (CoG) defined in the far-sloped portion that is between the inflection point and a middle point that is one half a length of the check valve portion.

2. A contoured check valve disc according to claim 1, wherein the check valve portion includes an area having a contoured profile formed at about the inflection point, where a fluid force acting on the one side provides a steady lift and lateral push action.

3. A contoured check valve disc according to claim 1, wherein the contoured check valve disc is a swing or tilt disc type check valve.

4. A contoured check valve disc according to claim 1, wherein the far-sloped portion includes two sub-portions, a first sub-portion being substantially flat and formed closest to a farthest point from the pivot portion, and a second sub-portion formed between the near-sloped portion and the first sub-portion, having less curvature than the first curvature of the near-sloped portion, and having more curvature than the first sub-portion.

5. A contoured check valve disc according to claim 1, wherein the first side and the second and opposing side both have the at least two contour portions.

6. A contoured check valve disc according to claim 1, wherein the at least two contour portions of the first side and the second and opposing side are substantially similar.

* * * * *